United States Patent
Kim et al.

(10) Patent No.: US 8,642,215 B2
(45) Date of Patent: Feb. 4, 2014

(54) NEGATIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(75) Inventors: Jae-Myung Kim, Yongin-si (KR); Tae-Sik Kim, Yongin-si (KR); Kyu-Nam Joo, Yongin-si (KR); Deok-Hyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/592,033

(22) Filed: Aug. 22, 2012

(65) Prior Publication Data

US 2013/0177813 A1 Jul. 11, 2013

(30) Foreign Application Priority Data

Jan. 6, 2012 (KR) ........................ 10-2012-0001960

(51) Int. Cl.
*H01M 4/134* (2010.01)
*H01M 4/133* (2010.01)
*H01M 4/1395* (2010.01)

(52) U.S. Cl.
USPC .................. 429/231.8; 429/218.1; 252/182.1; 204/164; 427/580

(58) Field of Classification Search
USPC .......... 429/231.8, 218.1; 204/164; 252/182.1, 252/503; 423/325, 335, 344, 345, 439; 427/580; 428/367, 402, 408; 502/178, 502/232
See application file for complete search history.

(56) References Cited

U.S. PATENT DOCUMENTS

| | | | | |
|---|---|---|---|---|
| 7,037,581 | B2 * | 5/2006 | Aramata et al. | 428/402 |
| 7,906,237 | B2 | 3/2011 | Adachi et al. | |
| 2002/0164479 | A1 * | 11/2002 | Matsubara et al. | 428/367 |
| 2006/0003227 | A1 | 1/2006 | Aramata et al. | |
| 2009/0004564 | A1 * | 1/2009 | Ishida et al. | 429/219 |
| 2012/0315482 | A1 * | 12/2012 | Muramatsu et al. | 428/402 |

FOREIGN PATENT DOCUMENTS

| | | |
|---|---|---|
| JP | 2003-197193 | 7/2003 |
| JP | 2006-19127 | 1/2006 |
| JP | 3952180 | 5/2007 |
| JP | 2008-288214 | 11/2008 |
| WO | WO 2011102473 A1 * | 8/2011 |

OTHER PUBLICATIONS

Wu, X. and Y. Ling, "Preparation of Silicon Carbide Nanorods by Arc Discharge", Guisuanyan Xuebao (2006), 34(10), 1283-1286. (Abstract Only).*
English Machine Translation of JP 2003-197193, 10 pages.

* cited by examiner

*Primary Examiner* — Carlos Barcena
*Assistant Examiner* — Lilia V Nedialkova
(74) *Attorney, Agent, or Firm* — Christie, Parker & Hale, LLP

(57) ABSTRACT

A negative active material for a rechargeable lithium battery includes a $SiO_x$ ($0.5 \leq x \leq 1.5$) compound including crystalline Si, and a $SiC_y$ ($0.5 \leq y \leq 1.5$) compound including crystalline carbon. The negative active material may be used in a rechargeable lithium battery to achieve high capacity and good cycle-life characteristics.

13 Claims, 7 Drawing Sheets

NEGATIVE ACTIVE MATERIAL FOR RECHARGEABLE LITHIUM BATTERY, METHOD OF PREPARING THE SAME AND RECHARGEABLE LITHIUM BATTERY INCLUDING THE SAME

RELATED APPLICATIONS

This application claims priority to and the benefit of Korean Patent Application No. 10-2012-0001960 filed in the Korean Intellectual Property Office on Jan. 6, 2012, the entire content of which is incorporated herein by reference.

BACKGROUND

1. Field

A negative active material for a rechargeable lithium battery, a method of preparing the same, and a rechargeable lithium battery including the same are disclosed.

2. Description of the Related Art

Rechargeable lithium batteries have recently drawn attention as power sources for small, portable electronic devices. Rechargeable lithium batteries use organic electrolyte solutions and thereby, have two or more times the discharge voltage of conventional batteries using alkaline aqueous solutions, and accordingly have high energy density.

As the positive active material, the rechargeable lithium battery typically uses a lithium-transition element composite oxide that is capable of intercalating lithium, for example, $LiCoO_2$, $LiMn_2O_4$, $LiNi_{1-x}Co_xO_2$ (0<x<1), and so on.

As the negative active material, the rechargeable lithium battery typically uses various carbon-based materials such as artificial graphite, natural graphite, and hard carbon, all of which can intercalate and deintercalate lithium ions. However, research has recently been conducted into non-carbon-based negative active materials, such as Si, in order to provide stability and high-capacity.

SUMMARY

In one embodiment of the present invention, a negative active material is capable of improving the high-capacity and cycle-life characteristics of a rechargeable lithium battery.

In another embodiment of the present invention, a method of preparing the negative active material is provided.

In yet another embodiment of the present invention, a rechargeable lithium battery includes the negative active material.

According to one embodiment of the present invention, a negative active material for a rechargeable lithium battery includes a $SiO_x$ (0.5≤x≤1.5) compound including crystalline Si, and a $SiC_y$ (0.5≤y≤1.5) compound that may include crystalline carbon.

The $SiC_y$ (0.5≤x≤1.5) compound may include crystalline carbon, non-crystalline carbon, crystalline SiC, and non-crystalline SiC.

The intensity ratio of the Si peak intensity at the (111) plane to the SiC peak intensity at the (111) plane may be about 1.0 to about 6.0 as measured by X-ray diffraction analysis (XRD) using a CuKα-ray.

The Si element may be included in an amount of about 40 wt % to about 80 wt % based on the entire weight of the negative active material.

The negative active material may include the oxygen (O) and carbon (C) elements in a weight ratio of about 1:3 to about 3:1.

The negative active material may further include an additional element selected from alkali metals, alkaline-earth metals, Group 13 to 16 elements, transition elements, rare earth elements, and combinations thereof.

The negative active material may have an average particle diameter of about 0.1 μm to about 10 μm.

The negative active material may further include a carbon coating layer.

The carbon coating layer may have a thickness of about 0.01 μm to about 1 μm.

The carbon coating layer may be an amorphous carbon selected from soft carbon, hard carbon, mesophase pitch carbonized products, fired coke, or mixtures thereof.

According to another embodiment of the present invention, a rechargeable lithium battery includes a negative electrode including the negative active material; a positive electrode including a positive active material; and a non-aqueous electrolyte.

According to yet another embodiment of the present invention, a method of preparing a negative active material for a rechargeable lithium battery includes preparing raw materials including a raw material including Si, a raw material including O, and a raw material including C; and disposing the raw materials between electrodes and arc-discharging them under an inert gas atmosphere to produce a $SiO_x$ (0.5≤x≤1.5) compound including crystalline Si and a $SiC_y$ (0.5≤y≤1.5) compound including crystalline carbon.

The method of preparing a negative active material for a rechargeable lithium battery uses Si, $SiO_2$ and carbon as raw materials, and the raw materials are contacted with an anode for arc discharge.

The Si and $SiO_2$ may be included in a weight ratio of about 1:1 to about 2.5:1.

The negative active material may be used to fabricate a rechargeable lithium battery with good cycle-life characteristics as well as high-capacity.

DETAILED DESCRIPTION

Figure 1:
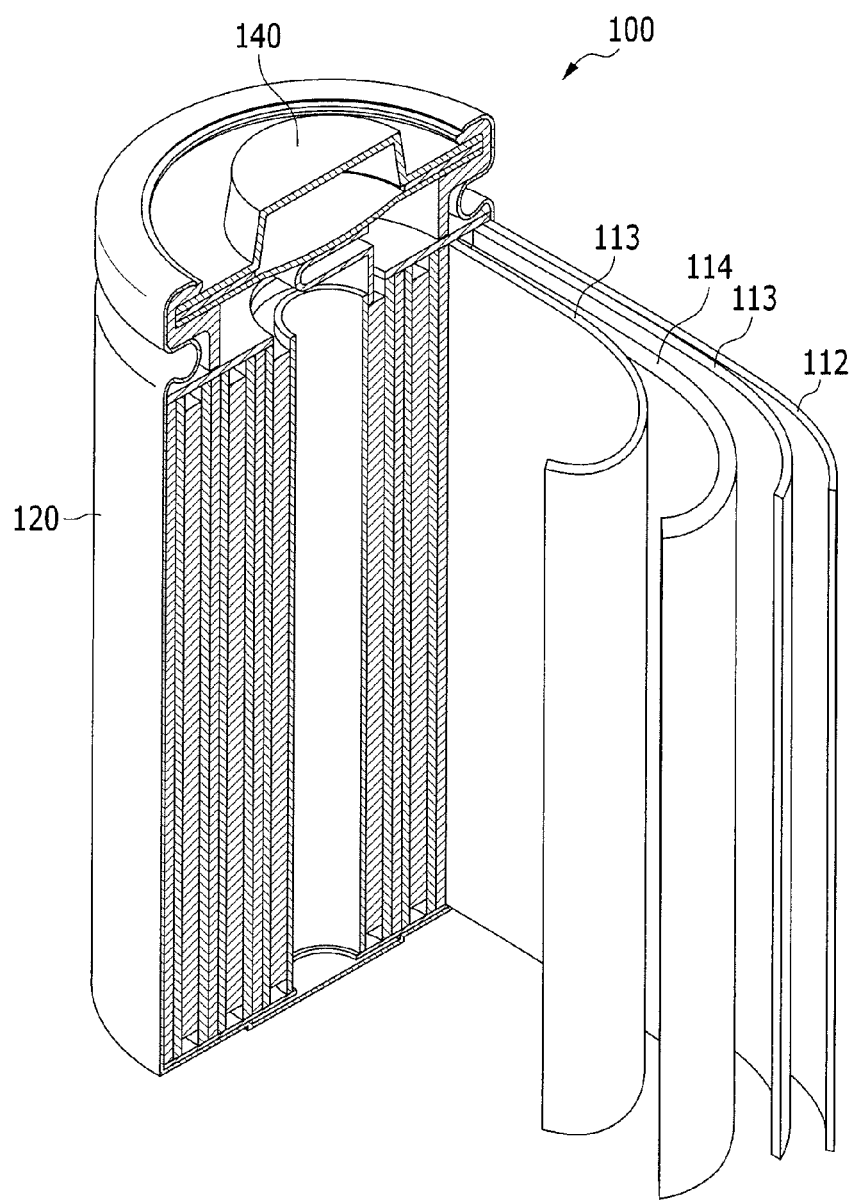
FIG. 1 is a schematic cross-sectional view of a rechargeable lithium battery according to an embodiment of the present invention.

Exemplary embodiments of the present invention will hereinafter be described in detail. However, these embodiments are only exemplary, and the present invention is not limited thereto.

A negative active material for a rechargeable lithium battery according to one embodiment of the present invention includes a SiO$_x$ (0.5≤x≤1.5) compound including crystalline Si, and a SiC$_y$ (0.5≤y≤1.5) compound including crystalline carbon.

The negative active material includes a silicon oxide which is capable of exhibiting high capacity, and the negative active material also includes a silicon carbide compound (SiC) and carbon (C) which are capable of improving conductivity, thereby providing a rechargeable lithium battery with improved cycle-life characteristics.

The SiO$_x$ (0.5≤x≤1.5) compound includes a silicon oxide and crystalline silicon. The silicon oxide, for example, may be a non-crystalline silicon oxide such as SiO$_2$, SiO, or the like.

The SiC$_y$ (0.5≤y≤1.5) compound may, for example, include crystalline carbon, non-crystalline carbon, crystalline hydrocarbon, and non-crystalline hydrocarbon.

The negative active material may have an intensity ratio of the Si peak intensity at the (111) plane to the SiC peak intensity at the (111) plane of about 1.0 to about 6.0 as measured by X-ray diffraction analysis (XRD) using a CuKα-ray. For example, the peak intensity ratio may be about 4.5 to about 6.0.

The negative active material may include the Si element in an amount of about 40 wt % to about 80 wt % based on the entire weight of the negative active material. The negative active material includes in a relatively high amount of the Si element (as shown be this range) and may accomplish high-capacity characteristics. In some embodiments, for example, the negative active material may include the Si element in an amount of about 60 wt % to about 70 wt %.

The negative active material may include the O and C elements in a weight ratio of about 1:3 to about 3:1.

The negative active material may further include an additional element that is not Si selected from alkali metals, alkaline-earth metals, Group 13 to 16 elements, transition elements, rare earth elements, and combinations thereof. Nonlimiting examples of the additional element include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The negative active material may have an average particle diameter of about 0.1 μm to about 10 μm.

The silicon-based negative active material may further include a carbon coating layer including a carbon-based material. The carbon-based material may further include a coating layer, and may further improve the initial efficiency and cycle-life characteristics of the rechargeable lithium battery.

The carbon-based material may include crystalline carbon or amorphous carbon. Nonlimiting examples of the crystalline carbon include non-shaped, or sheet, flake, spherical, or fiber-shaped natural or artificial graphite. Nonlimiting examples of the amorphous carbon include soft carbon, hard carbon, mesophase pitch carbonized products, fired coke, and the like.

The carbon coating layer may have a thickness of about 0.01 μm to about 1 μm. When the carbon coating layer has a thickness within this range, appropriate capacity may be achieved.

The negative active material may be prepared in an arc discharge method.

According to another embodiment of the present invention, a method of preparing a negative active material for a rechargeable lithium battery includes preparing raw materials including a Si raw material, an O raw material, and a C raw material; and disposing the raw materials between electrodes and arc-discharging them under an inert gas atmosphere to produce a SiO$_x$ (0.5≤x≤1.5) compound including crystalline Si and a SiC$_y$ (0.5≤y≤1.5) compound including crystalline carbon.

The method of preparing a negative active material for a rechargeable lithium battery may provide the above mentioned negative active material.

The raw materials may include Si, SiO$_2$, and carbon.

Figure 2:
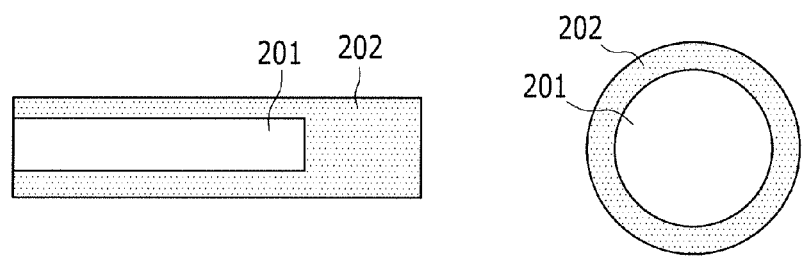
FIG. 2 is a schematic depicting the raw materials used to prepare the negative active material in an arc discharge method according to an embodiment of the present invention.

According to one embodiment of the present invention, to prepare the raw materials, a carbon rod 202 is prepared and a mixture 201 of Si and SiO$_2$ powders is filled in the carbon rod 202 (refer to FIG. 2). FIG. 2 depicts a vertical cross-section of the carbon rod 202 filled with the mixture 201 of Si and SiO$_2$ powders, and a horizontal cross-section of the carbon rod 202 filled with the mixture 201 of Si and SiO$_2$ powders.

The mixing ratio of the Si and SiO$_2$ powders is controlled to prepare the desired negative active material. In some embodiments, for example, the Si and SiO$_2$ powders may be mixed in a weight ratio of about 1:1 to about 2.5:1.

The carbon rod 202 filled with the mixture 201 of Si and SiO$_2$ powders is contacted with an anode and supplied with a current to effect an arc discharge under an inert atmosphere. According to the arc discharge, the above-described negative active material is prepared and collected from a collector in the arc discharge device.

The negative active material may be additionally surface-treated with a carbon-based material to form a carbon coating layer thereon. The carbon-based material may be the same as discussed above. The surface treatment has no particular limit but may include any common surface treatment. For example, the surface treatment may include magnetron sputtering, electron beam deposition, IBAD (ion beam assisted deposition), CVD (chemical vapor deposition), a sol-gel method, or a method of ionizing evaporated particles into a layer.

According to another embodiment of the present invention, a rechargeable lithium battery includes a negative electrode including the negative active material; a positive electrode including a positive active material; and a non-aqueous electrolyte.

The rechargeable lithium battery may be a lithium ion battery, a lithium ion polymer battery, or a lithium polymer battery depending on the kind of separator and the kind of electrolyte used therein. The rechargeable lithium battery may have a variety of shapes and sizes and thus, may be cylindrical, prismatic, coin-shaped, or pouch-shaped, and may be a thin film type or a bulky type. The structures and methods of fabricating lithium batteries are known in the art.

FIG. 1 is an exploded perspective view of a rechargeable lithium battery according to one embodiment. Referring to FIG. 1, the rechargeable lithium battery 100 includes a negative electrode 112, a positive electrode 114, a separator 113 between the negative electrode 112 and the positive electrode 114, an electrolyte (not shown) impregnating the negative electrode 112, positive electrode 114, and separator 113, a battery case 120, and a sealing member 140 sealing the battery case 120. The rechargeable lithium battery 100 is fabricated by sequentially laminating the negative electrode 112, positive electrode 114, and separator 113, spirally winding them, and housing the spiral-wound product in a battery case 120.

The negative electrode includes a current collector and a negative active material layer on the current collector. The negative active material layer may include a negative active material. The negative active material is the same as described above. The negative active material layer includes a binder and optionally, a conductive material.

The binder improves the binding properties of the negative active material particles to each other and to the current collector. Nonlimiting examples of the binder include polyvinylalcohol, carboxymethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

The conductive material improves the electrical conductivity of the negative electrode. Any electrically conductive material can be used as a conductive agent so long as it does not cause a chemical change. Nonlimiting examples of the conductive material include carbon-based materials such as natural graphite, artificial graphite, carbon black, acetylene black, ketjen black, carbon fibers, and the like; metal-based materials such as metal powders, metal fibers, or the like including copper, nickel, aluminum, silver, or the like; conductive polymers such as polyphenylene derivatives, and the like; and mixtures thereof.

The current collector includes a copper foil, a nickel foil, a stainless steel foil, a titanium foil, a nickel foam, a copper foam, a polymer substrate coated with a conductive metal, or a combination thereof.

The positive electrode may include a current collector and a positive active material layer formed on the current collector.

The positive active material includes a lithiated intercalation compound that reversibly intercalates and deintercalates lithium ions. Examples of the positive active material include composite oxides including at least one of cobalt, manganese, and nickel, as well as lithium. In particular, the following lithium-containing compounds may be used:

$Li_aA_{1-b}R_bD_2$ (0.90≤a≤1.8 and 0≤b≤0.5)
$Li_aE_{1-b}R_bO_{2-c}D_c$ (0.90≤a≤1.8, 0≤b≤0.5 and 0≤c≤0.05)
$LiE_{2-b}R_bO_{4-c}D_c$ (0≤b≤0.5, 0≤c≤0.05)
$Li_aNi_{1-b-c}Co_bR_cD_\alpha$ (0.90≤a≤1.8, 0≤b≤0.5, 0≤c≤0.05 and 0<α≤2)
$Li_aNi_{1-b-c}Co_bR_cO_{2-\alpha}Z_\alpha$ (0.90≤a≤1.8, 0≤b≤0.5, 0≤c≤0.05 and 0<α<2)
$Li_aNi_{1-b-c}Co_bR_cO_{2-\alpha}Z_2$ (0.90≤a≤1.8, 0≤b≤0.5, 0≤c≤0.05 and 0<α<2)
$Li_aNi_{1-b-c}Mn_bR_cD_\alpha$ (0.90≤a≤1.8, 0≤b≤0.5, 0≤c≤0.05 and 0<α≤2)
$Li_aNi_{1-b-c}Mn_bR_cO_{2-\alpha}Z_\alpha$ (0.90≤a≤1.8, 0≤b≤0.5, 0≤c≤0.05 and 0<α<2)
$Li_aNi_{1-b-c}Mn_bR_cO_{2-\alpha}Z_2$ (0.90≤a≤1.8, 0≤b≤0.5, 0≤c≤0.05 and 0<α<2)
$Li_aNi_bE_cG_dO_2$ (0.90≤a≤1.8, 0≤b≤0.9, 0≤c≤0.5 and 0.001≤d≤0.1)
$Li_aNi_bCo_cMn_dG_eO_2$ (0.90≤a≤1.8, 0≤b≤0.9, 0≤c≤0.5, 0≤d≤0.5 and 0.001≤e≤0.1)
$Li_aNiG_bO_2$ (0.90≤a≤1.8 and 0.001≤b≤0.1)
$Li_aCoG_bO_2$ (0.90≤a≤1.8 and 0.001≤b≤0.1)
$Li_aMnG_bO_2$ (0.90≤a≤1.8 and 0.001≤b≤0.1)
$Li_aMn_2G_bO_4$ (0.90≤a≤1.8 and 0.001≤b≤0.1)
$QO_2$
$QS_2$
$LiQS_2$
$V_2O_5$
$LiV_2O_5$
$LiTO_2$
$LiNiVO_4$
$Li_{(3-f)}J_2(PO_4)_3$ (0≤f≤2)
$Li_{(3-f)}Fe_2(PO_4)_3$ (0≤f≤2)
$LiFePO_4$ In the above chemical formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The positive active material may be a compound with a coating layer on the surface, or a mixture of the active material and a compound with a coating layer thereon. The coating layer may include at least one coating element compound selected from oxides of the coating element, hydroxides of the coating element, oxyhydroxides of the coating element, oxycarbonates of the coating element, and hydroxycarbonates of the coating element. The compound for the coating layer may be either amorphous or crystalline. The coating element included in the coating layer may be selected from Mg, Al, Co, K, Na, Ca, Si, Ti, V, Sn, Ge, Ga, B, As, Zr, or a mixture thereof. The coating may applied by any conventional processes so long as it does not cause any undesirable side effects on the properties of the positive active material. For example, the coating may be applied by spray coating, immersing, or the like, which are known to those of ordinary skill in this art.

The positive active material layer may further include oxalic acid as a binder.

The binder improves the binding properties of the positive active material particles to one another and to the current collector. Nonlimiting examples of the binder include at least one selected from polyvinyl alcohol, carboxymethyl cellulose, hydroxypropyl cellulose, diacetyl cellulose, polyvinylchloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material improves the electrical conductivity of the positive electrode. Any electrically conductive material can be used as the conductive material so long as it does not cause a chemical change. Nonlimiting examples of the conductive material include at least one selected from natural graphite, artificial graphite, carbon black, acetylene black, ketjen black, carbon fibers, metal powders, metal fibers of copper, nickel, aluminum, silver, and the like, and polyphenylene derivatives.

The current collector may be Al but is not limited thereto.

The negative and positive electrodes may be fabricated according to a method including preparing an active material composition (which includes mixing the active material, a conductive material, and a binder), and coating the composition on a current collector. The method of manufacturing electrodes is known. The solvent may include N-methylpyrrolidone or the like but is not limited thereto.

The electrolyte may include a non-aqueous organic solvent and a lithium salt.

The non-aqueous organic solvent serves to transmit the ions taking part in the electrochemical reactions of the battery.

The non-aqueous organic solvent may include a carbonate-based, ester-based, ether-based, ketone-based, alcohol-based, or aprotic solvent. Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Nonlimiting examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Nonlimiting examples of the ether-based solvent include dibutyl ether, tetraglyme, diglyme, dimethoxyethane, 2-methyltetrahydrofuran, tetrahydrofuran and the like. Nonlimiting examples of the ketone-based solvent include cyclohexanone, and the like. Nonlimiting examples of the alcohol-based solvent include ethanol, isopropylalcohol, and the like. Nonlimiting examples of the aprotic solvent include nitriles such as R—CN (wherein R is a C2 to C20 linear, branched, or cyclic hydrocarbon group, and may include a double bond, an aromatic ring, or an ether bond), amides such as dimethylformamide, dimethylacetamide, dioxolanes such as 1,3-dioxolane, sulfolanes, and the like.

A single non-aqueous organic solvent may be used, or a mixture of solvents may be used. When the organic solvent includes a mixture of solvents, the mixing ratio may be controlled to achieve the desired performance of the battery.

The carbonate-based solvent may include a mixture of cyclic carbonates and linear carbonates. The cyclic carbonates and the linear carbonates may be mixed together in a volume ratio of about 1:1 to about 1:9 in the electrolyte, and the electrolyte may enhance performance.

In addition, the non-aqueous organic solvent may further include an aromatic hydrocarbon-based solvent in addition to the carbonate-based solvent. The carbonate-based solvent and the aromatic hydrocarbon-based solvent may be mixed together in a volume ratio of about 1:1 to about 30:1.

The aromatic hydrocarbon-based organic solvent may be an aromatic hydrocarbon-based compound represented by the following Chemical Formula 1.

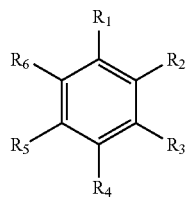

Chemical Formula 1

In Chemical Formula 1, each of $R_1$ to $R_6$ is independently hydrogen, a halogen, a C1 to C10 alkyl group, a C1 to C10 haloalkyl group, or a combination thereof.

The aromatic hydrocarbon-based organic solvent may include, but is not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate or an ethylene carbonate-based compound represented by the following Chemical Formula 2 as an additive to improve the cycle-life of the battery.

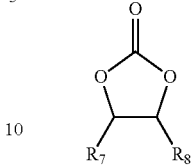

Chemical Formula 2

In Chemical Formula 2, each of $R_7$ and $R_8$ is independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$) or a C1 to C5 fluoroalkyl group (i.e., at least one of $R_7$ and $R_8$ is not hydrogen).

Nonlimiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or ethylene carbonate-based compound for improving cycle life may be adjusted within an appropriate range.

The lithium salt is dissolved in the non-aqueous organic solvent and supplies the lithium ions in the rechargeable lithium battery, thereby enabling the basic operation of the rechargeable lithium battery and improving lithium ion transfer between the positive and negative electrodes. The lithium salt may include a supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), and combinations thereof. The lithium salt may be used in a concentration of about 0.1M to about 2.0M. When the lithium salt is included within this concentration range, it may yield good electrolyte performance and lithium ion mobility due to optimal electrolyte conductivity and viscosity.

The separator 113 serves to separate the negative electrode 112 from the positive electrode 114 and provides a path for the lithium ions. The separator may be made of any material commonly used in lithium batteries. The separator has low resistance against ion transfer in the electrolyte, and good wetting ability in the electrolyte. For example, the separator may be a glass fiber, polyester, TEFLON (tetrafluoroethylne), polyethylene, polypropylene, polytetrafluoroethylene (PTFE), or a combination thereof, and may be a non-woven fabric or a woven fabric. For example, a polyolefin-based polymer separator such as polyethylene or the like may be used for a lithium ion battery, and a separator coated with a ceramic component or a polymer material may be used to secure heat resistance or mechanical strength. The separator may have a single layer or multiple layers.

The following examples are presented for illustrative purposes only, and do not limit the scope of the present invention.

EXAMPLE

Example 1

Preparation of Negative Active Material

A raw material was prepared by forming a hole with a diameter of about 22 mm inside a carbon rod with a diameter of about 25 mm and then filling the hole with a mixture of Si and $SiO_2$ powders mixed in a weight ratio of about 2.5:1. The raw material was put in an arc discharger, and the air was evacuated from the arc discharger which was then filled with He gas.

The arc discharger was supplied with a current of about 300 A at about 40 V to generate an arc discharge, and thus a nano powder was prepared.

Example 2

Preparation of Negative Active Material

An nano powder was prepared according to the same method as Example 1, except that the carbon rod was filled with a mixture of Si and $SiO_2$ powders mixed in a weight ratio of about 2:1.

Example 3

Preparation of Negative Active Material

An nano powder was prepared according to the same method as Example 1, except that the carbon rod was filled with a mixture of Si and $SiO_2$ powders mixed in a weight ratio of about 1.5:1.

Example 4

Preparation of Negative Active Material

An nano powder was prepared according to the same method as Example 1, except that the carbon rod was filled with a mixture of Si and $SiO_2$ powders mixed in a weight ratio of about 1:1.

Figure 4:
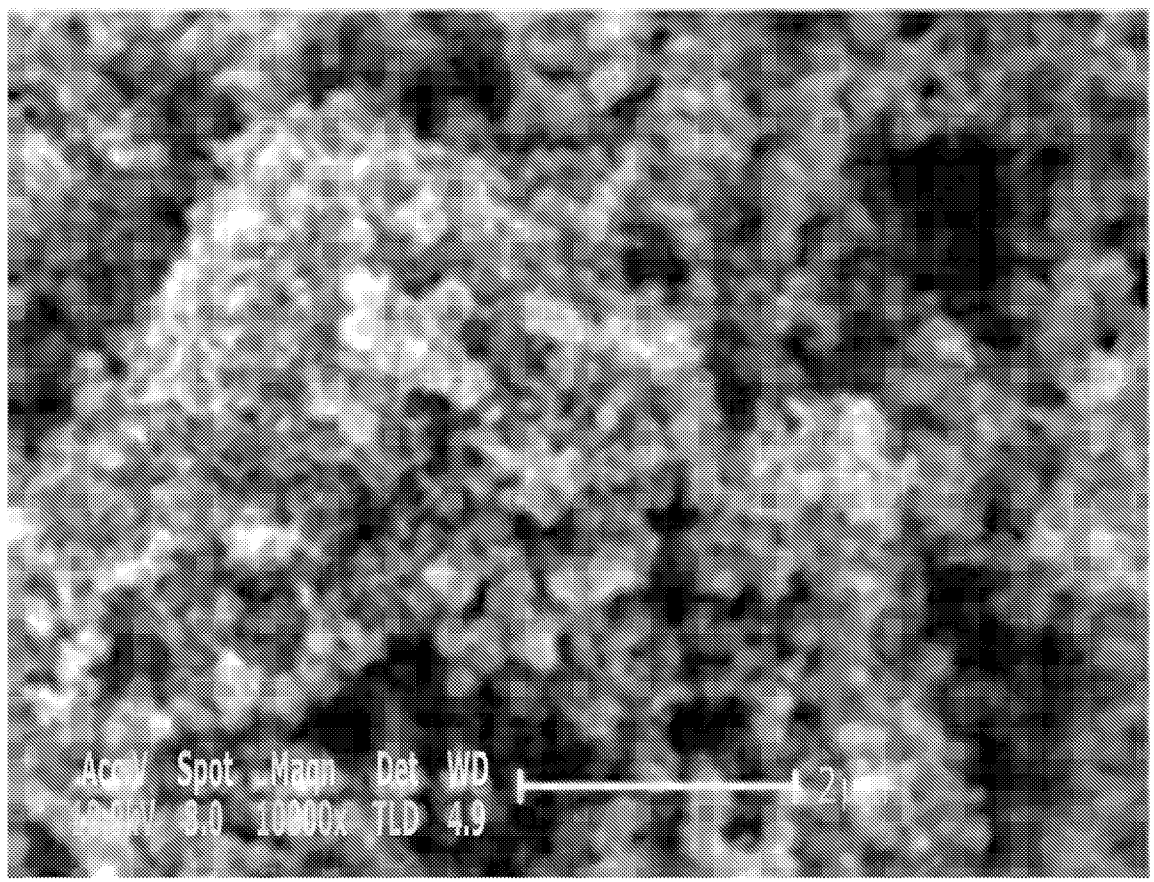
FIG. 4 is a scanning electron microscope (SEM) photograph of the negative active material prepared according to Example 3.

FIG. 4 is a scanning electron microscope (SEM) photograph of the nano powder according to Example 3.

Examples 5 to 8

Fabrication of Rechargeable Lithium Battery Cells

Each of the nano powders according to Examples 1 to 4 were used as a negative active material to fabricate a 2016 coin-type half-cell. A negative electrode was fabricated by mixing the active material, a conductive material, and a binder in a weight ratio of about 80:10:10 in a solvent to prepare a negative active material composition, and coating the negative active material composition on a Cu foil current collector. The conductive material was Denka black, the binder was PI (polyimide), and the solvent was NMP (N-METHYL-2-PYRROLIDONE). Then, a cell was fabricated using lithium metal as the counter electrode, positioning a separator between the counter electrode and negative electrode as shown in FIG. 1, spirally winding them, inserting the wound product in a can, and injecting an electrolyte solution into the can. The electrolyte solution was prepared by mixing EC (ethylene carbonate)/EMC (ethylmethyl carbonate)/DMC (dimethylcarbonate) in a volume ratio of about 3/3/4 and dissolving 1 M $LiPF_6$ and about 5 volume % of a FEC (fluorinated ethyl carbonate) additive therein.

Experimental Example 1

X-Ray Diffraction (XRD) Analysis

Figure 3:
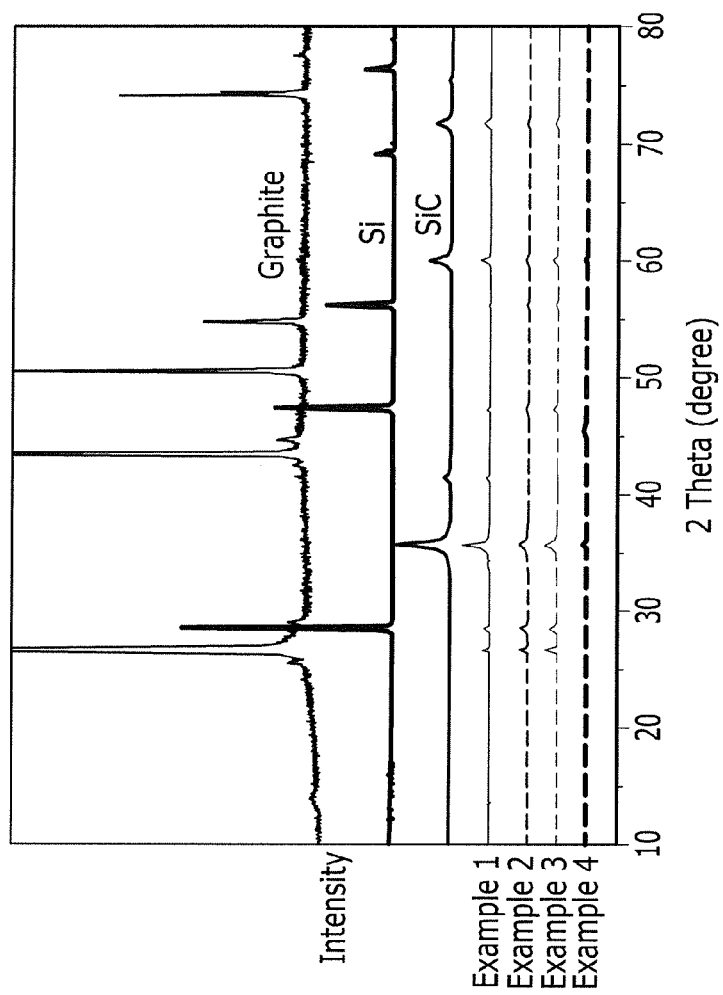
FIG. 3 is a graph comparing the X-ray diffraction analysis (XRD) results of the negative active materials prepared according to Examples 1 through 4.

The nano powders according to Examples 1 to 4, Si, SiC, and graphite were analyzed by X-ray diffraction (XRD). The results are provided in FIG. 3.

The X-ray diffraction analysis was performed using a CuKα-ray with a X-ray wavelength of 1.541 Å, and an XPERT-PRO (Philips) was used as the X-ray diffraction analyzer.

The nano powders according to Examples 1 to 4 were identified to include Si and SiC crystals and crystalline carbon based on a comparison to the XRD peaks of Si, SiC, and graphite. Based on the results shown in FIG. 3, the ratio between the SiC peak intensity at the (111) plane to the Si peak intensity at the (111) plane was calculated, and the results are shown in the following Table 1.

TABLE 1

| | Intensity ratio of SiC peak to the Si peak | FWHM of SiC plane peak (°) |
|---|---|---|
| Example 1 | 5.5 | 0.46 |
| Example 2 | 5.0 | 0.59 |
| Example 3 | 1.4 | 0.93 |
| Example 4 | 1.8 | 0.68 |

Experimental Example 2

Measurement of the Amount of Elements

Figure 6:
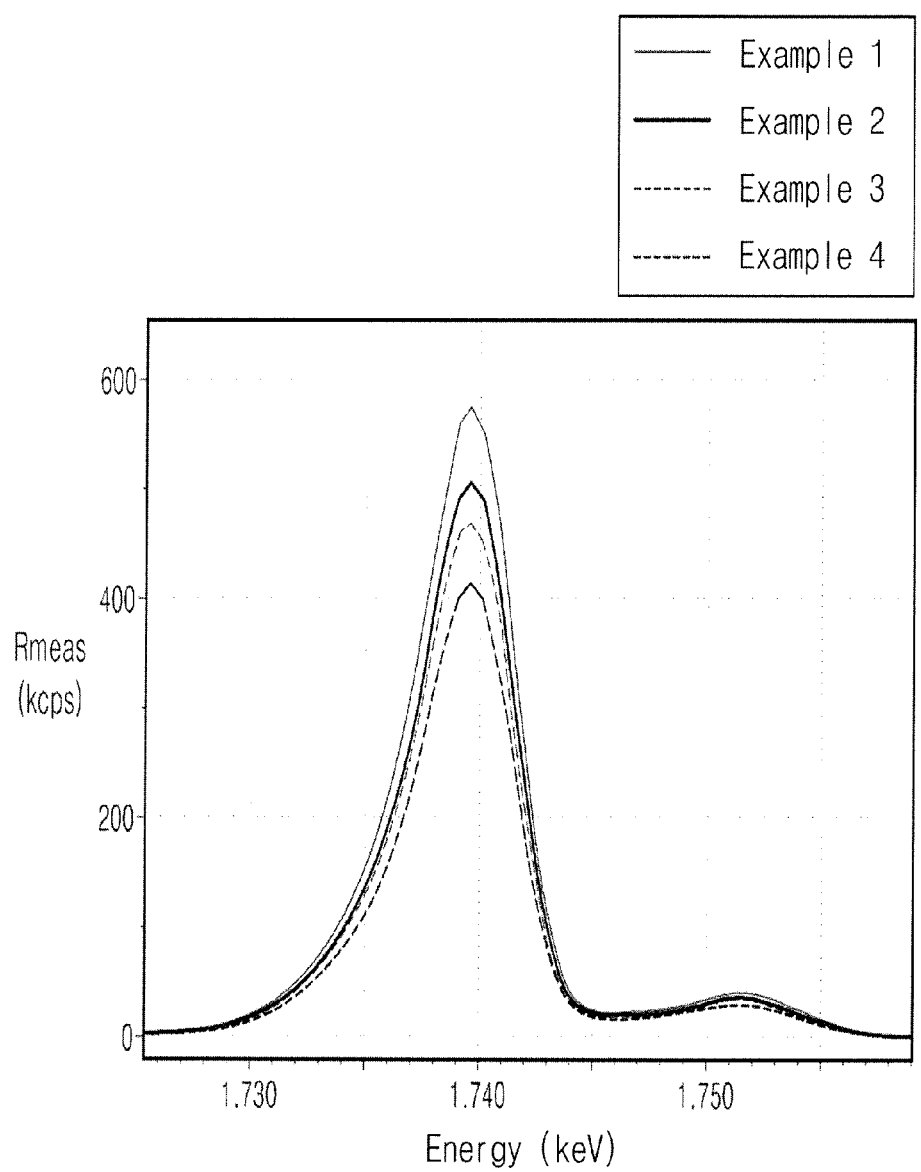
FIG. 6 is a graph comparing the X-ray fluorescence (XRF) analysis of Si in Examples 1 through 4.
Figure 7:
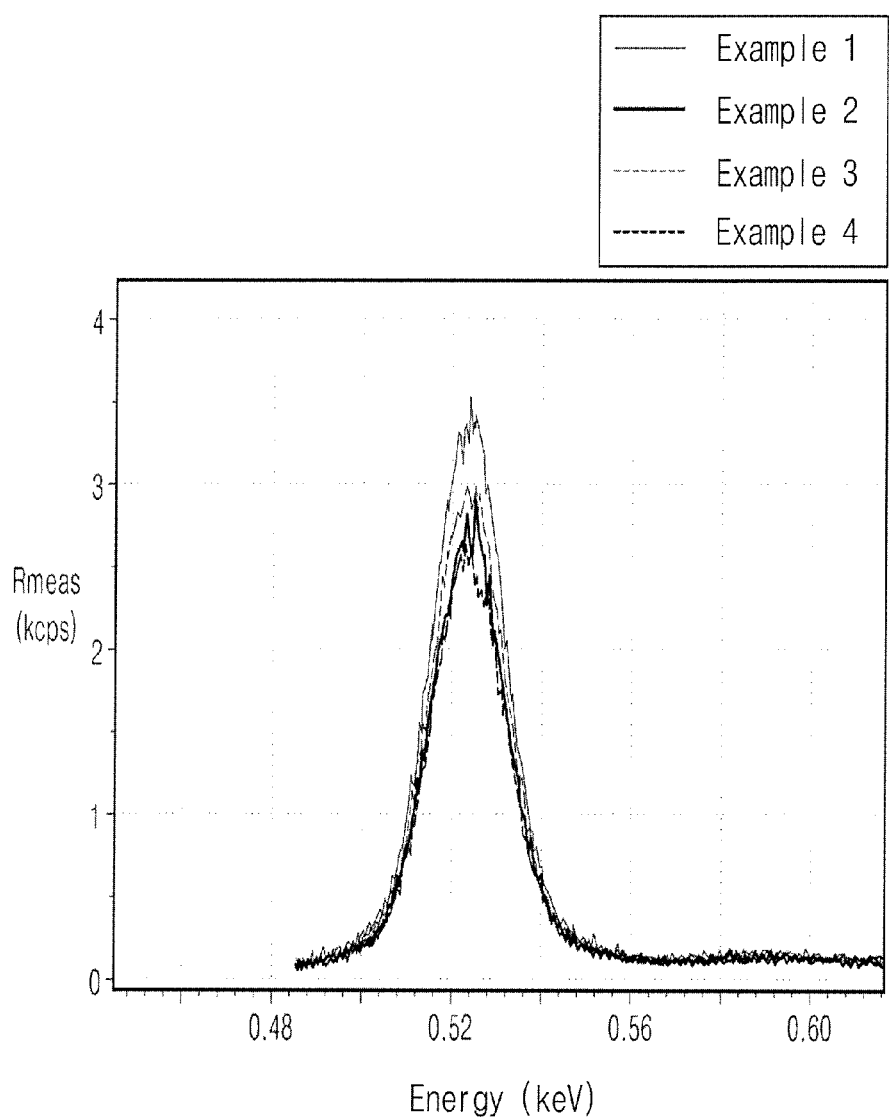
FIG. 7 is a graph comparing the X-ray fluorescence (XRF) analysis of O in Examples 1 through 4.

The nano powders according to Examples 1 to 4 were analyzed for Si and O content using an XRF (X-ray fluorescence) analyzer, obtaining an XRF analysis graph. FIGS. 6 and 7 is the XRF analysis graph of the content of Si, and FIG. 7 is the XRF analysis graph of the content of O. The X-ray fluorescence analysis was performed using a WD-XRF (Philips PW2400).

The amounts of the silicon and oxygen elements were calculated from the intensity ratio of the peaks corresponding to silicon and oxygen in each graph shown in FIGS. 6 and 7 using a calibration curve relative to a standard sample.

The amount of carbon was analyzed using a carbon analyzer (CS).

Table 2 shows the amount of the silicon, oxygen, and carbon elements included in the negative active materials according to Examples 1 to 4.

TABLE 2

| | Silicon (Si) (wt %) | Oxygen (O) (wt %) | Carbon (C) (wt %) |
|---|---|---|---|
| Example 1 | 65-70 | 25-28 | 10-15 |
| Example 2 | 60-65 | 22-25 | 15-20 |
| Example 3 | 55-60 | 19-22 | 20-25 |
| Example 4 | 50-55 | 15-19 | 25-30 |

Experimental Example 3

Capacity and Cycle-Life Evaluation

Each rechargeable lithium battery cell according to Examples 5 to 8 was charged with a current of about 100 mA per about 1 g of negative active material up to a voltage of about 0.001 V (vs. Li), and then discharged with the same current up to a voltage of about 3 V (vs. Li). Then, the charge and discharge were repeated 50 times with the same current within the same voltage range.

Table 3 shows the discharge capacity at the first cycle, initial charge and discharge efficiency, and capacity retention of each rechargeable lithium battery. The capacity retention was calculated according to the following Equation 1, and the initial charge and discharge efficiency were calculated according to the following Equation 2.

$$\text{Capacity retention [\%]} = [50^{th} \text{ cycle discharge capacity}/ 2^{nd} \text{ cycle discharge capacity}] \times 100 \quad \text{Equation 1}$$

$$\text{Initial charge and discharge efficiency [\%]} = [1^{st} \text{ cycle discharge capacity}/1^{st} \text{ cycle charge capacity}] \times 100 \quad \text{Equation 2}$$

TABLE 3

|  | 1st cycle discharge capacity [mAh/g] | Initial charge and discharge efficiency [%] | Capacity retention [%] |
|---|---|---|---|
| Example 5 | 2270 | 50 | 60 |
| Example 6 | 1830 | 67 | 50 |
| Example 7 | 1260 | 60 | 45 |
| Example 8 | 1020 | 52 | 40 |

The lithium rechargeable battery cells according to Examples 5 to 8 had good discharge capacity, initial efficiency and capacity retention.

Figure 5:
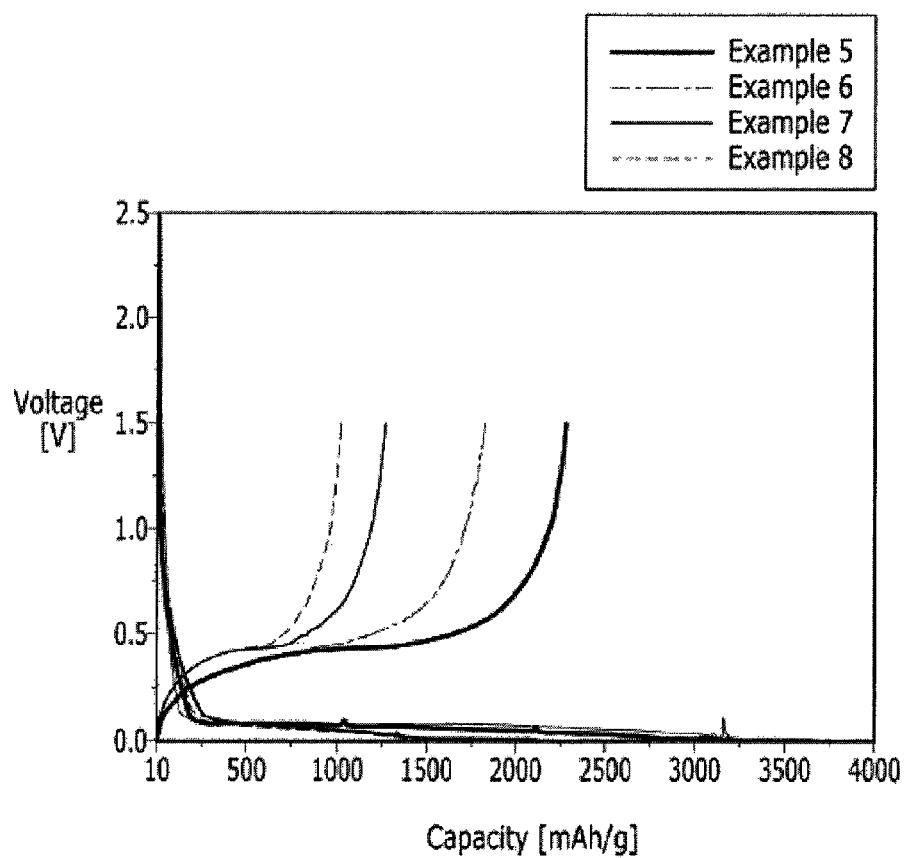
FIG. 5 is a graph comparing the charge and discharge of the rechargeable lithium batteries including the negative active materials prepared according to Examples 1 through 4.

FIG. 5 shows the charge and discharge curve of each rechargeable lithium battery cell according to Examples 5 to 8. The lithium rechargeable battery cells according to Examples 5 to 8 had good capacity characteristics. In particular, the lithium rechargeable battery cells according to Examples 5 and 6 had better capacity characteristics.

While this disclosure has been illustrated and described in connection with certain exemplary embodiments, those or ordinary skill in the art will appreciate the certain modifications and changes can be made to the described embodiments without departing from the spirit and scope of the invention, as defined in the appended claims.

What is claimed is:

1. A negative active material for a rechargeable lithium battery, comprising:
    a $SiO_x$ (0.5≤x≤1.5) compound including crystalline Si, and
    a $SiC_y$ (0.5≤y≤1.5) compound including crystalline carbon, non-crystalline carbon, crystalline SiC, and non-crystalline SiC.

2. The negative active material for a rechargeable lithium battery of claim 1, wherein an intensity ratio between a SiC peak intensity at a (111) plane to a Si peak intensity at a (111) plane is about 1.0 to 6.0 as measured by X-ray diffraction analysis (XRD) using a CuKα-ray.

3. The negative active material for a rechargeable lithium battery of claim 1, wherein the negative active material comprises a Si element in an amount of about 40 wt % to about 80 wt % based on an entire weight of the negative active material.

4. The negative active material for a rechargeable lithium battery of claim 1, wherein the negative active material comprises O and C elements in a weight ratio of about 1:3 to about 3:1.

5. The negative active material for a rechargeable lithium battery of claim 1, further comprising an alkali metal, an alkaline-earth metal, a Group 13 to 16 element, a transition element, a rare earth element, or a combination thereof.

6. The negative active material for a rechargeable lithium battery of claim 1, wherein the negative active material has an average particle diameter of about 0.1 μm to about 10 μm.

7. The negative active material for a rechargeable lithium battery of claim 1, further comprising a carbon coating layer.

8. The negative active material for a rechargeable lithium battery of claim 7, wherein the carbon coating layer has a thickness of about 0.01 μm to about 1 μm.

9. The negative active material for a rechargeable lithium battery of claim 7, wherein the carbon coating layer comprises an amorphous carbon selected from the group consisting of soft carbon, hard carbon, mesophase pitch carbonized products, fired coke, and mixtures thereof.

10. A rechargeable lithium battery comprising
    a negative electrode including the negative active material of claim 1;
    a positive electrode including a positive active material; and
    a non-aqueous electrolyte.

11. A method of preparing a negative active material for a rechargeable lithium battery comprising:
    preparing a first raw material comprising a Si element, preparing a second raw material comprising an O element, and preparing a third raw material comprising a C element; and
    disposing the first, second and third raw materials between the a pair of electrodes and arc-discharging them under an inert gas atmosphere to produce a $SiO_x$ (0.5≤x≤1.5) compound comprising crystalline Si and a $SiC_y$ (0.5≤y≤1.5) compound comprising crystalline carbon.

12. The method of preparing a negative active material of claim 11, wherein the first raw material comprises Si, the second raw material comprises $SiO_2$, and the third raw material comprises carbon, and the first, second and third raw materials are contacted with an anode for the arc-discharging.

13. The method of preparing a negative active material of claim 12, wherein the first raw material and the second raw material are mixed in a weight ratio of about 1:1 to about 2.5:1.

* * * * *